US012235047B2

(12) United States Patent
Maggioli et al.

(10) Patent No.: US 12,235,047 B2
(45) Date of Patent: Feb. 25, 2025

(54) METHOD FOR PROTECTING AN INNER WALL OF A SHAFT FURNACE

(71) Applicant: PAUL WURTH S.A., Luxembourg (LU)

(72) Inventors: Nicolas Maggioli, Thionville (FR); Esmer Mustafa, Samsun (TR)

(73) Assignee: PAUL WURTH S.A., Luxembourg (LU)

( * ) Notice: Subject to any disclaimer, the term of this patent is extended or adjusted under 35 U.S.C. 154(b) by 419 days.

(21) Appl. No.: 17/299,182

(22) PCT Filed: Dec. 13, 2019

(86) PCT No.: PCT/EP2019/085174
§ 371 (c)(1),
(2) Date: Jun. 2, 2021

(87) PCT Pub. No.: WO2020/120771
PCT Pub. Date: Jun. 18, 2020

(65) Prior Publication Data

US 2022/0074667 A1 Mar. 10, 2022

(30) Foreign Application Priority Data

Dec. 13, 2018 (LU) ....................................... 101057

(51) Int. Cl.
*F27D 1/16* (2006.01)
*F27B 1/14* (2006.01)
(Continued)

(52) U.S. Cl.
CPC .............. *F27D 1/1678* (2013.01); *F27B 1/14* (2013.01); *F27D 1/0003* (2013.01);
(Continued)

(58) Field of Classification Search
CPC ............................. F27D 1/1636; F27D 1/1678
See application file for complete search history.

(56) References Cited

U.S. PATENT DOCUMENTS 2,666,975 A * 1/1954 Govan .................... C04B 35/01
501/130
3,202,732 A * 8/1965 Braun ................ E04G 23/0203
220/592.28
(Continued)

FOREIGN PATENT DOCUMENTS

EP 0921199 A1 6/1999
JP H0322453 A 1/1991
(Continued)

OTHER PUBLICATIONS

Nakamura, JP-H05322453-A and translation (Year: 1993).*
(Continued)

*Primary Examiner* — Steven S Anderson, II
(74) *Attorney, Agent, or Firm* — CANTOR COLBURN LLP

(57) ABSTRACT

A method for protecting an inner wall (12) of a shaft furnace, the method comprising the steps of: providing at least one injection device (28) through the inner wall (12) of the shaft furnace, the injection device (28) being configured to inject protective material into the shaft furnace; and injecting on demand the protective material into the shaft furnace through the injection device (28), in such a manner that the protective material builds up to form a protection wall between the interior of the shaft furnace and the furnace wall (12).

11 Claims, 2 Drawing Sheets

(51) Int. Cl.
*F27D 1/00* (2006.01)
*F27D 1/04* (2006.01)

(52) U.S. Cl.
CPC ......... *F27D 1/1626* (2013.01); *F27D 1/1642* (2013.01); *F27D 2001/047* (2013.01); *F27D 2001/161* (2013.01)

(56) References Cited

U.S. PATENT DOCUMENTS

| | | | |
|---|---|---|---|
| 3,953,007 | A | 4/1976 | Van Laar |
| 5,916,500 | A | 6/1999 | Fisher, Jr. |
| 2012/0018122 | A1 | 1/2012 | Joubert |

FOREIGN PATENT DOCUMENTS

| | | | | |
|---|---|---|---|---|
| JP | H05322453 | A | * | 12/1993 |
| JP | 2002030310 | A | | 1/2002 |
| JP | 2003171708 | | | 6/2003 |
| KR | 101161255 | B1 | | 11/2010 |
| KR | 101572390 | B1 | | 11/2015 |

OTHER PUBLICATIONS

International Preliminary Report on Patentability for corresponding application PCT/EP2019/085174 filed Dec. 13, 2019; Mail date Jan. 15, 2021.

International Search Report for corresponding application PCT/EP2019/085174 filed Dec. 13, 2019; Mail date Jan. 1, 2020.

Rudolf Hebel, "Blast furnace hearth lining and cooling concepts" Technik & Trends, (2008) XP-001549585.

Written Opinion for corresponding application PCT/EP2019/085174 filed Dec. 13, 2019; Mail date Jan. 1, 2020.

Chinese Office Action for corresponding application CN201980082619.2 dated May 13, 2022.

Examination report issued in the corresponding Taiwanese application No. 108145737; Dated Jun. 15, 2023.

Hearing Report for IN application 202117026047; Dated Jan. 16, 2024.

* cited by examiner

METHOD FOR PROTECTING AN INNER WALL OF A SHAFT FURNACE

TECHNICAL FIELD

The present disclosure relates to a method for operating a shaft furnace, like for example a blast furnace. The present disclosure particularly relates to a method for protecting an inner wall of a shaft furnace.

BACKGROUND

The inner walls of a shaft furnace are typically covered by a lining of cooling staves to dissipate heat generated by the extreme temperature applied during furnace operations and prevent the furnace wall from damage caused by extreme heat.

A cooling stave is generally a heat conductive plate made of copper or steel or alloys, equipped with a cooling circuit and having connection means to be attached to a furnace wall. The cooling circuit may be a hollow path running inside the cooling stave and having any desired design. The circuit is fed with a circulating cooling fluid, like for example water that is then extracted from the cooling stave carrying heat away from the furnace wall.

During shaft furnace operations, some areas of the furnace wall are subject to more erosion, damage and/or high heat loads than others. In modern, high duty shaft furnaces, it has been found that the time period between two successive repairs is determined to a considerable degree by wearing properties of the furnace lining, which in turn are dependent upon a large number of factors, such as durability against high temperature, chemical attack and mechanical wear, and also the mode of cooling the furnace.

Excessive amount of heat can weaken the cooling staves, deforms them and eventually leads to irreversible damage. To mitigate these effects, the blast furnace process and the burden material charging profile may be modified. Excessive erosion of the cooling staves, which can be caused by the abrasive action of the flow of burden material, can remove the metal around the cooling circuit which eventually becomes exposed, leaking coolant fluid into the furnace. A common remedy to stop the leakage is to stop the fluid supply in the cooling channel until a next programmed maintenance operation.

In the above cases, it is necessary to temporarily modify the furnace operation and reduce its performance in order to prevent further damages. Additionally, the above solutions do not provide any means to prevent the negative effects of the furnace operations on the cooling staves.

In order to slow down wear on the cooling staves, the latter are often protected by another lining comprising refractory bricks. The refractory bricks are designed to offer ideal heat conductivity and resistance to wear. They do not comprise cooling circuits and slowly erode before exposing the cooling staves.

There are known solutions in the art in order to improve the resistance to erosion of a refractory brick lining in a blast furnace. For example, U.S. Pat. No. 3,953,007 A discloses a shaft furnace having a refractory-lined wall provided with liquid-cooled cooling plates. The cooling plates are protected from the furnace interior by a first layer of refractory bricks having a first heat conductivity coefficient. The first layer is further partially covered with a second layer of refractory bricks having a second heat conductivity coefficient.

The combination of layers of bricks having different heat conductivity coefficient improves the distribution of heat in areas that are more subject to high temperatures. Other areas that undergo stronger abrasion effects are covered by bricks with higher resistance to wear.

The known solutions only provide temporary protection and do not offer the possibility to maintain the copper staves. Solutions to protect the stave lining inside the furnace are limited by the resistance to heat or erosion of the material used, and involve production loss during maintenance operations.

BRIEF SUMMARY

It is therefore desirable to provide an improved method for protecting a wall of a shaft furnace and particularly for protecting a stave lining inside a shaft furnace, without the above described shortcomings.

The present disclosure proposes a method for protecting an inner wall of a shaft furnace, wherein the furnace wall comprises a lining of cooling staves, the cooling staves having a hot face facing the furnace interior, said hot face comprising a profile with ribs and grooves the method comprising the steps of:

providing at least one injection device through the inner wall of the shaft furnace and through a cooling stave, the device being configured to inject protective material into the shaft furnace against the cooling staves; and injecting on demand the protective material into the shaft furnace through the at least one injection device, in such a manner that the protective material builds up to form a protection wall between the interior of the shaft furnace and the cooling staves lining the furnace wall.

The method according to the disclosure provides a way to create or modify on demand an accretion layer of protective material between the interior wall of the furnace and burden material flowing in the shaft furnace. Hence, the burden material's erosion effects are only affecting the renewable accretion layer forming a protection wall. When the protection wall is damaged, a new wall can be entirely or partially rebuilt by injecting a new layer of protective material. Importantly, this maintenance operation can be performed during normal furnace operation, i.e. without stopping, changing or disturbing the production process inside the shaft furnace. The injected material thus protects the cooling elements of the furnace wall from erosion and deformation due to heat loads, extending their service time.

It should be noted that, while the injection devices may be provided between or beside the cooling elements, a better integration of the protective material will be obtain by injecting it directly within the cooling elements.

Preferably, the hot face of the cooling stave comprises a profile with ribs and grooves and wherein the step of providing the injection device through the cooling stave comprises the step of passing the injection device through a rib, or a groove of the profile of the hot face of the stave.

In embodiments of the method according to the disclosure, the cooling stave may comprise at least one protection ledge, wherein the step of providing the injection device through the cooling stave comprises the step of providing the injection device right above the protection ledge. The protective material injected there may be retained by the protection ledge. In embodiments, the method comprises the step of providing the injection device right below the protection ledge. Below the ledge the injection device is sheltered from the flow of burden material, reducing the risks of clogging the device.

Advantageously, the step of injecting the protective material comprises the step of covering the furnace wall with protective material by gravity. The protective wall may then be provided as a flow in the same direction as the burden material.

In preferred embodiments, the step of injecting protective material comprises the step of injecting protective material during furnace operation. The layer of protective material may be regulated to essentially maintain a certain minimum thickness. Injection is provided to compensate in real time an erosion of the accretion layer. The injection may also be modified according to the current process parameters of the shaft furnace.

Preferably, the step of injecting the protective material comprises the step of injecting the protective material at a predetermined angle relative to the inner wall of the shaft furnace. The injection angle may depend on the actual inclination of the inner wall of the shaft furnace at the location of the injector device to improve the distribution of the protective material along the inner wall.

The protective material may comprise solid material, fluid material or a combination of solid and fluid materials. As the burden material reacts and transforms flowing down to the hearth of the furnace, the efficiency of the accretion layer may be improved by adapting its composition and consequently its properties to the material it is in contact with. Any suitable type of protective material may be used to modify the properties of the accretion layer.

In embodiments, the protective material comprises granular, stamped or big particles. The injection device may be further adapted to the type of material that it will inject into the furnace.

The protective material may comprise granular material of e.g. round shape so as to provide a buffer rolling layer between burden material and furnace wall. When providing an accretion layer configured to flow down the furnace wall or the cooling staves together with the burden material, the accretion layer absorbs the abrasion effects from the burden material, but its flow against the furnace wall might be responsible for an erosion of the wall. Round shape granular material may limit abrasion of the furnace wall caused by the protective material itself.

In preferred embodiments of the disclosure, the protective material comprises slag, coal, ore, sinter, refractory material, mill scales or pellet. These materials are also commonly comprised in the burden material charged into the shaft furnace. Protective material removed from the accretion layer may thus be mixed with burden material without too much impact on the reaction inside the shaft furnace.

In embodiments, the protective material is a protective powder material injected in a fluid. In order to use elements that may be comprised in the burden material, the protective powder may comprise as a fluid, $N_2$ or blast furnace clean gas recovered from a lower level.

The protective material may, in particular if it is in solid form, be injected into the shaft furnace by means of a mechanical injection device. Such a mechanical injection device may e.g. comprise a piston for pushing the protective material into the shaft furnace.

BRIEF DESCRIPTION OF THE DRAWINGS

Further details and advantages of the present disclosure will be apparent from the following detailed description of not limiting embodiments with reference to the attached drawing, wherein.

DETAILED DESCRIPTION

A preferred embodiment of the method will be described applied in the context of a shaft furnace, generally a blast furnace. Such a shaft furnace is partially shown in FIG. 1, comprising a lower part with a hearth portion 10 where iron and slag are collected, and a shell having an inner wall 12 forming a generally cylindrical barrel which extends upwardly from the hearth portion 10. For a better understanding, reference 14 represents part of the furnace interior volume, wherein, in operation, burden material (not shown) is charged.

Figure 1:
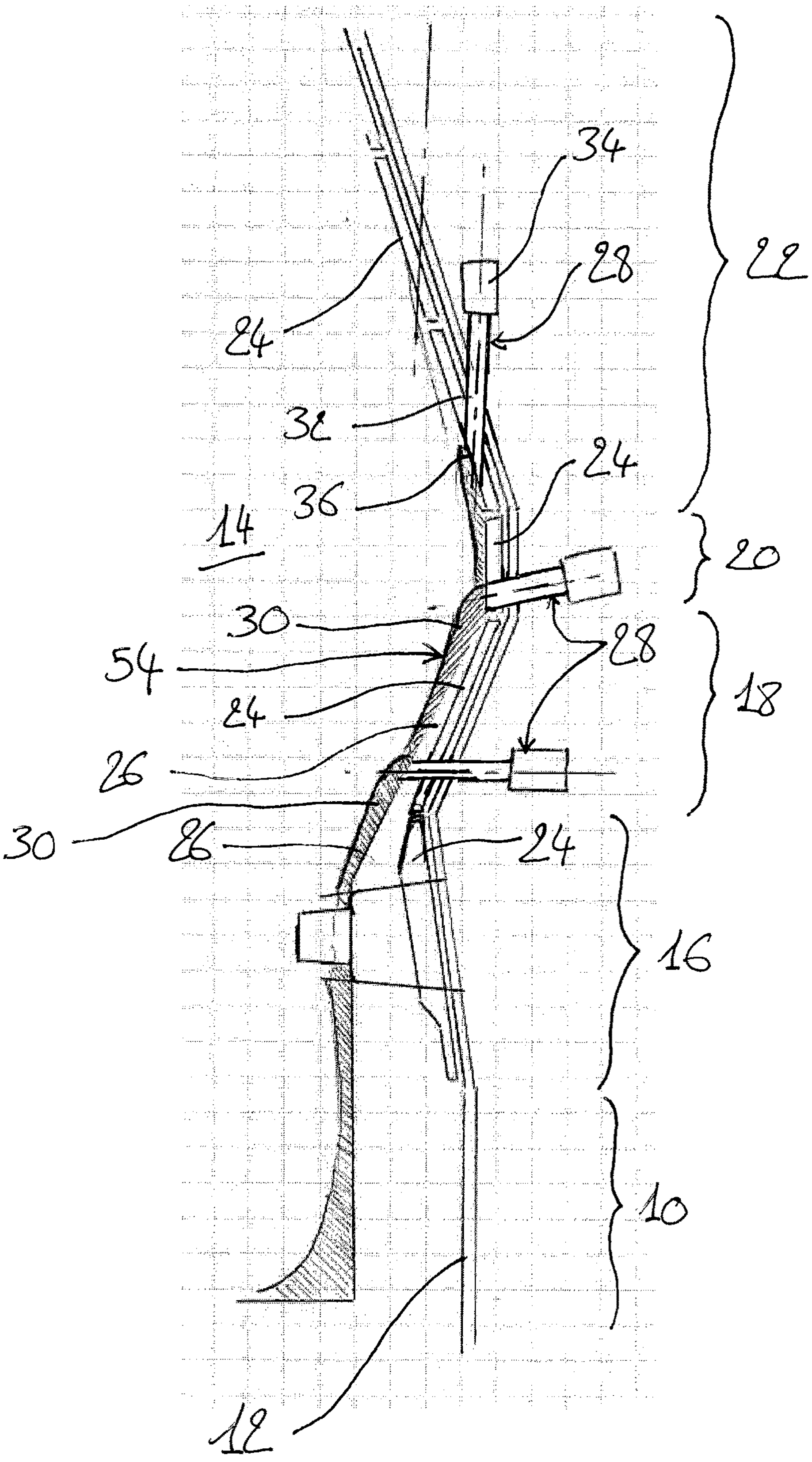
FIG. 1 is a schematic cross-section view of a part of a blast furnace comprising injection device provided according to one preferred embodiment of the disclosure.

As shown in FIG. 1, the inner wall 12 comprises portions of different diameters. From the hearth portion 10 to the top, the shaft furnace comprises a tuyere surrounding 16, a bosh portion 18, a belly portion 20 and a stack portion 22. Above the stack portion 22, the shaft furnace further comprises a throat and a charging installation (not shown) for charging material into the shaft furnace.

The inner wall 12 is covered by a lining of heat protection elements, such as e.g. cooling staves 24. The cooling staves 24 are further covered by a lining of refractory material 26 in the tuyere surroundings 16 and bosh portion 18 of the inner wall 12. In other embodiments, the inner wall may be covered by a different lining or by more than one lining with heat refractive material and/or cooling elements.

The cooling staves 24 are generally arranged in rows of adjacent staves mounted on top of one another from the tuyere surroundings 16 to the top of the stack portion 22. The cooling staves 24 may have different shapes and material and comprise a cooling circuit (not shown) for circulating a cooling fluid therein.

The method for protecting the inner wall 12 of the shaft furnace according to one preferred embodiment of the disclosure comprises one step of providing a plurality of injection devices 28 through the inner wall 12 of the shaft furnace. The injection devices 28 are configured to inject protective material 30 into the shaft furnace. The injection devices 28 are advantageously provided over the circumference of the shaft furnace and distributed in rows to cover all the portions of the inner wall 12. The quantity and position of the injection devices 28 may vary depending on the shape and dimensions of the inner wall 12, and on the type of injection device 28 used.

The injection device 28 may comprise any appropriate device and may be designed according to the type of protective material that will be injected into the shaft furnace. The injection devices 28 are schematically represented in FIG. 1 comprising a straight injection lance 32 and a supply apparatus 34. The injection lance 32 comprises an open end 36 in the furnace interior 14 and forms a canal between the supply apparatus 34 and the interior 14 of the shaft furnace. The supply apparatus 34 is configured to route the protective material from storage means (not shown) through the injection lance 32 into the interior 14 of the shaft furnace.

The injection devices 28 are provided from the outside of the shaft furnace and are fed through the inner wall 12. Connection of the injection devices 28 may be obtained by any suitable means, such as for example by welding.

As shown in FIG. 1, the open ends 36 of the injection lances 32 may be arranged at different orientations depending on their location in the inner wall 12. The orientation is adapted in relation with the local inclination of the inner wall 12. The inner wall 12 in the bosh portion 18 of the furnace is slanted toward the exterior of the shaft furnace and, accordingly, the injection lances 32 passing through the inner wall of the bosh are preferably essentially horizontal. In the belly portion 20, the inner wall 12 is essentially vertical and the open ends 36 of the injection lances 32 are arranged at an angle relative to the horizontal, pointing down into the furnace interior 14. In the stack portion 22, the inner wall 12 is slanted toward the interior of the shaft furnace, narrowing the shaft furnace width until the throat. In the latter portion of the inner wall 12, the injection lances 32 are roughly vertical.

FIGS. 2 to 5 show different embodiments wherein the open end 36 of the injection lance 32 is provided in different locations relatively to one cooling stave 24.

In FIGS. 2 to 5, the cooling stave 24 has a hot face 40 facing the interior of the furnace and a cold face 38 facing the inner wall 12 of the shaft furnace. The hot face 40 of the cooling stave 24 comprises a profile with ribs 42 and grooves 44. The cold face 38 of the cooling stave 24 is connected to the inner wall 12 by any suitable means (not shown). Here, a gap 46 is provided between the cold face 38 and the inner wall 12. The gap 46 may be filed with a refractory material. The gap 46 comprises a spacer 48 between the cooling stave 24 and the inner wall 12 that is configured to maintain the cooling stave 24 at a predetermined distance from the inner wall 12. A passage for the injection lance 32 is preferably arranged in the spacer 48 in order to protect the injection lance 32 from the refractory material. In these embodiments, the installation further comprises a guiding pipe 50 used to guide the injection lance 32 on the outer side of the inner wall 12.

In the four embodiments of FIGS. 2 to 5, the injection device 28 is provided with an injection lance 32 essentially perpendicular to the cooling stave 24. The skilled person will understand that the orientation of the injection lance 32 may be different without changing the location of the open end 36 of the injection lance 32.

Figure 2:
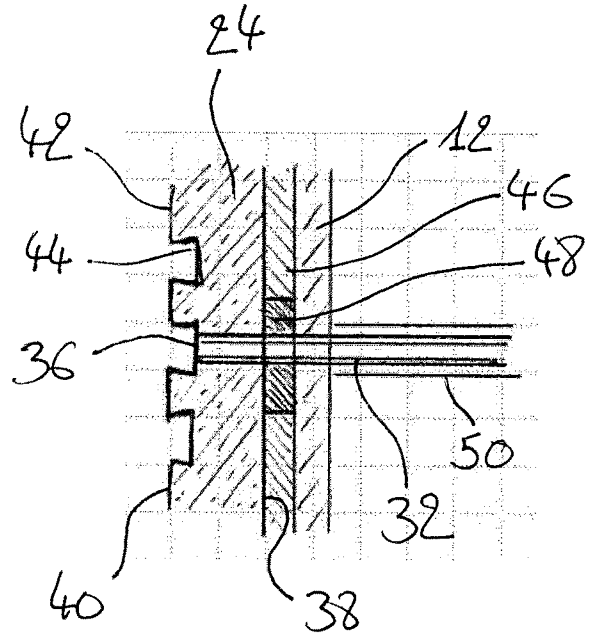
FIGS. 2 to 5 are cross-section views of different configurations of the injection device provided according to embodiments the disclosure.

In the embodiment as shown in FIG. 2, the injection lance 32 passes through the cooling stave 24 and opens into a groove 44 of the stave profile.

Figure 3:
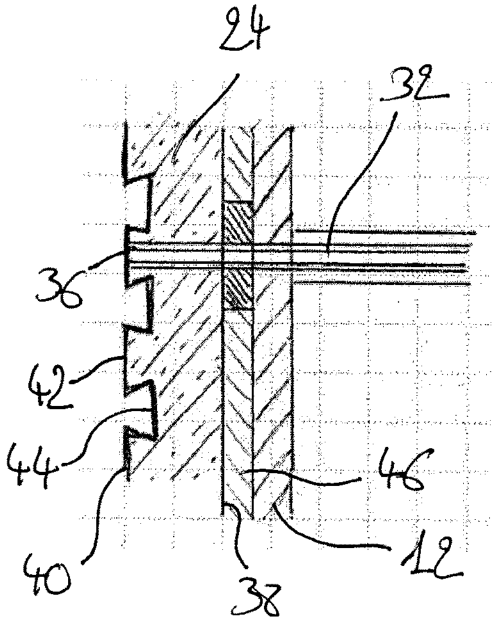

In the embodiment of FIG. 3, the injection lance 32 passes through the cooling stave 24 and opens into a rib 42 of the stave profile.

Figure 4:
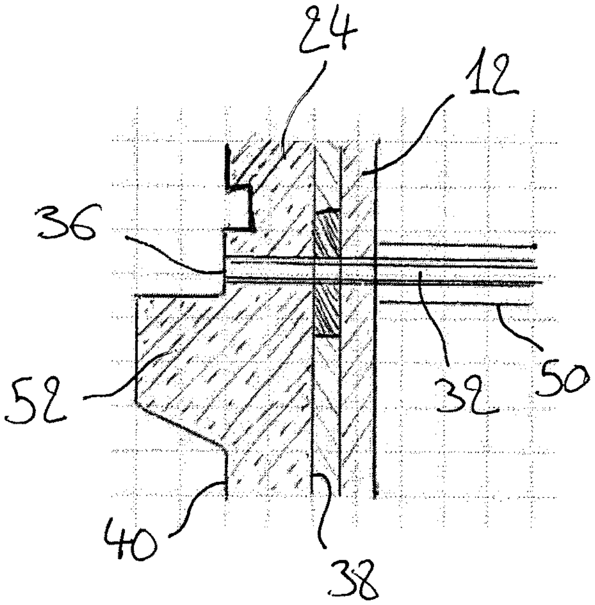
Figure 5:
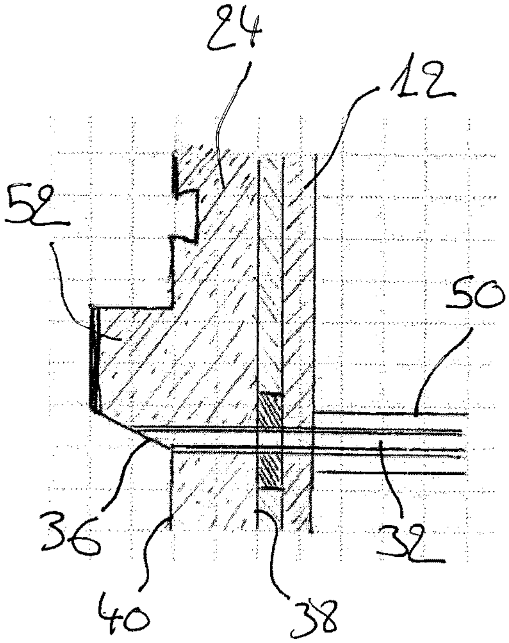

In the embodiments of FIGS. 4 and 5, the cooling stave 24 further comprises a ledge 52 protruding from its hot face 40. The ledge 52 is generally provided in order to disturb a flow of burden material along the cooling stave 24. The ledge 52 is also configured to retain burden material on top of it and to allow formation of a localized material layer that protects the cooling stave 24 from abrasion.

In the embodiment of FIG. 4, the injection lance 32 passes through the cooling stave 24 and opens into the hot face 40 of the cooling stave 24 at a location above the ledge 52.

In the embodiment of FIG. 5, on the other hand, the injection lance 32 passes through the cooling stave 24 and opens into the hot face 40 of the cooling stave 24 at a location below the ledge 52.

In operation, the injection devices 28 are used for injecting the protective material into the shaft furnace. Such injection may be carried out on demand, in such a manner that the protective material builds up to form a protection wall between the interior of the furnace and the furnace wall.

The protective material 30 comprises here solid material carried by a fluid carrier. The solid material may for example comprise slag, coal, ore sinter, refractory material, mills scales or pellet, to have a limited impact on the reaction inside the shaft furnace. For the same reasons, the fluid carrier may for example comprise blast furnace clean gas or $N_2$.

Once injected, the protective material 30 simply flows down along the hot face 40 of the cooling staves 24 by gravity and covers the surface of the inner wall 12, thereby forming an accretion layer 54 on the hot face 40 of the cooling staves 24. As shown in FIG. 1, in the tuyere surroundings 16 and bosh portion 18, the accretion layer 54 is formed on the lining of refractory material 26 to protect or further protect the cooling staves 24.

When burden material is charged into the shaft furnace, it comes into contact with the accretion layer 54, suppressing abrasion effects to the cooling staves 24. To minimize a potential abrasion effect caused by the protective material 30 flowing over the cooling staves 24, the protective material 30 may comprise granular material of e.g. round shape.

The protective material 30 is further injected on demand before the cooling staves become exposed to the burden material. During furnace operation, the burden material continuously flows down to the hearth of the shaft furnace. The flow of burden material carries along particles of the protective layer, reducing the thickness of the accretion layer 54. The protective material 30 may therefore be injected at a certain flow rate to maintain a predetermined minimum thickness of protective layer between the burden material and the staves 24. If a more rapid thinning of the accretion layer 54 is detected in a particular region of the shaft furnace, the injection of protective material 30 may be regulated to increase the amount of protective material through a selected injection device in order to compensate for such localized thinning.

The protective material 30 can be injected through $N_2$ gas at a predefined pressure depending on the pressure of burden material at the open end 36 of the injection lance 32. This is particularly advantageous if the protective material 30 is in granular form. If the protective material 30 is however in a larger solid form, such as e.g. slag, coal, ore, sinter, refractory material, mills scales or pellet, it may be more advantageous to inject the protective material 30 mechanically. To this effect, the injection device may e.g. comprise a piston for pushing the protective material into the shaft furnace.

In embodiments, the protective material 30 may comprise solid blocks of material successively injected into the furnace, or different protective material may be successively injected. For example, the method may comprise a first step of injecting a layer of fluid material; then injecting solid material into the layer of fluid material.

The invention claimed is:

1. Method for protecting a wall of a shaft furnace, wherein the furnace wall comprises a lining of cooling staves and an innermost surface which directly interfaces with an interior of the shaft furnace, the method comprising the steps of:

providing at least one injection device through the furnace wall and through a cooling stave, the injection device comprising an injection lance having an open-end at the innermost surface of the furnace wall and being configured to inject protective material into the interior of the shaft furnace and onto the innermost surface, wherein the protective material comprises at least one of slag, coal, ore, sinter, refractory material, mills scales and mills pellet; and injecting on demand the protective material into the shaft furnace through the at least one injection device, in such a manner that the protective material builds up to form a protection wall on the innermost surface of the furnace wall, wherein a hot face of the cooling stave comprises a profile with ribs and grooves, wherein the step of providing the injection device through the cooling stave comprises the step of passing the injection device through a rib or a groove of the profile of the hot face of the cooling stave, wherein the formed protection wall comes into contact with burden material during a normal furnace operation, and wherein said injecting on demand occurs during the normal furnace operation.

2. Method according to claim 1, wherein the cooling stave comprises at least one protection ledge, wherein the step of providing the injection device through the cooling stave comprises the step of providing the injection device above, through or below the protection ledge.

3. Method according to claim 1, wherein the step of injecting protective material comprises the step of covering the furnace wall with protective material by gravity.

4. Method according to claim 1, wherein the step of injecting protective material comprises the step of injecting protective material during furnace operation.

5. Method according to claim 1, wherein the step of injecting protective material comprises the step of injecting protective material at a predetermined angle relative to the inner wall of the shaft furnace.

6. Method according to claim 1, wherein the protective material comprises solid material, fluid material, or a combination of solid and fluid materials.

7. Method according to claim 6, wherein the protective material comprises granular particles or stamped or particles, or particles that are larger than said granular particles and said stamped particles.

8. Method according to claim 7, wherein the protective material comprises a round shape granular material.

9. Method according to claim 1, wherein the protective material is mechanically injected into the shaft furnace by a mechanical injection device comprising a piston for pushing the protective material into the shaft furnace.

10. Method according to any of claim 1, wherein the protective material is a protective powder material injected in a fluid.

11. Method according to claim 10, wherein the protective powder comprises $N_2$ or blast furnace clean gas recovered from a lower level as a fluid.

* * * * *